(12) United States Patent
Alecci et al.

(10) Patent No.: US 11,036,609 B2
(45) Date of Patent: *Jun. 15, 2021

(54) SYSTEM AND METHOD FOR IMPROVED PROCESSING PERFORMANCE

(71) Applicant: JPMorgan Chase Bank, N.A., New York, NY (US)

(72) Inventors: Donald V. Alecci, Boonton Township, NJ (US); Michael Aguiling, Tappan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/441,077

(22) Filed: Jun. 14, 2019

(65) Prior Publication Data
US 2019/0347179 A1    Nov. 14, 2019

Related U.S. Application Data

(63) Continuation of application No. 14/293,150, filed on Jun. 2, 2014, now Pat. No. 10,365,986, which is a
(Continued)

(51) Int. Cl.
*G06F 11/34*      (2006.01)
*H04L 12/26*      (2006.01)

(52) U.S. Cl.
CPC ...... *G06F 11/3428* (2013.01); *G06F 11/3433* (2013.01); *H04L 43/0876* (2013.01); *G06F 2201/815* (2013.01)

(58) Field of Classification Search
CPC ............. G06F 11/3428; G06F 11/3433; G06F 2201/815; H04L 43/0876
See application file for complete search history.

(56) References Cited

U.S. PATENT DOCUMENTS 6,571,283 B1    5/2003    Smorodinsky
7,035,919 B1    4/2006    Lee
(Continued)

FOREIGN PATENT DOCUMENTS

EP    0306891    3/1989
EP    0518420    12/1992
(Continued)

OTHER PUBLICATIONS

Benchmark definition Merriam Webster https://www.merriam-webster.com/dictionary/benchmark.
(Continued)

*Primary Examiner* — Regis J Betsch
(74) *Attorney, Agent, or Firm* — Greenblum & Bernstein, P.L.C.

(57) ABSTRACT

The invention is directed to a computer-implemented method and system for improving processing performance for a group of computing resources, the method implemented on at least one computer having a processor and accessing at least one data storage area. The method comprises implementing the processor for calculating a benchmark for each computing resource in the group of computing resources and normalizing the benchmark across the group of computing resources to determine a number of performance units for each computing resource. The method additionally includes providing a graphical user interface for facilitating visual comparison for comparing processing performance indicators for multiple computing resources in the group of computing resources and reconfiguring at least some of the computing resources represented on the graphical user interface based on the comparison.

19 Claims, 13 Drawing Sheets

Related U.S. Application Data continuation of application No. 12/556,801, filed on Sep. 10, 2009, now Pat. No. 8,775,125.

(56) References Cited

U.S. PATENT DOCUMENTS

| | | | |
|---|---|---|---|
| 7,047,177 B1 * | 5/2006 | Lee | H04L 41/0823 |
| | | | 703/22 |
| 7,062,426 B1 | 6/2006 | McDonald | |
| 7,174,379 B2 * | 2/2007 | Agarwal | G06F 9/505 |
| | | | 709/226 |
| 7,490,220 B2 | 2/2009 | Balasubramonian | |
| 7,546,598 B2 | 6/2009 | Blumenthal | |
| 7,606,778 B2 | 10/2009 | Dewar | |
| 7,664,048 B1 | 2/2010 | Yung | |
| 7,779,290 B2 | 8/2010 | Beekhuis | |
| 7,962,247 B2 | 6/2011 | Beekhuis | |
| 7,966,100 B2 | 6/2011 | Beekhuis | |
| 8,029,288 B2 | 10/2011 | Beekhuis | |
| 8,086,558 B2 | 12/2011 | Dewar | |
| 8,103,856 B2 | 1/2012 | Balasubramonian | |
| 8,364,998 B2 | 1/2013 | Hsu | |
| 8,407,081 B1 | 3/2013 | Rajasenan | |
| 2002/0042823 A1 | 4/2002 | DeBettencourt | |
| 2002/0055866 A1 | 5/2002 | Dewar | |
| 2003/0191680 A1 | 10/2003 | Dewar | |
| 2003/0195786 A1 | 10/2003 | Dewar | |
| 2003/0200136 A1 | 10/2003 | Dewar | |
| 2006/0069776 A1 | 3/2006 | Shim | |
| 2006/0106923 A1 | 5/2006 | Balasubramonian | |
| 2007/0192406 A1 | 8/2007 | Frietsch | |
| 2008/0028048 A1 | 1/2008 | Shekar CS | |
| 2008/0250356 A1 * | 10/2008 | Johns | G06F 3/04815 |
| | | | 715/853 |
| 2009/0043548 A1 | 2/2009 | Beekhuis | |
| 2009/0132302 A1 | 5/2009 | Beekhuis | |
| 2009/0187446 A1 | 7/2009 | Dewar | |
| 2009/0299536 A1 | 12/2009 | Beekhuis | |
| 2009/0300166 A1 | 12/2009 | Chen | |
| 2009/0300719 A1 | 12/2009 | Ferris | |
| 2009/0313056 A1 | 12/2009 | Beekhuis | |
| 2009/0313081 A1 | 12/2009 | Beekhuis | |
| 2009/0313496 A1 | 12/2009 | Beekhuis | |
| 2010/0042574 A1 | 2/2010 | Dewar | |
| 2010/0070319 A1 | 3/2010 | Prafullchandra | |
| 2010/0223425 A1 | 9/2010 | Meagher | |
| 2010/0287019 A1 * | 11/2010 | Guo | G06F 11/3495 |
| | | | 709/224 |
| 2012/0124363 A1 | 5/2012 | Dietrich | |
| 2012/0180062 A1 | 7/2012 | Sohi | |
| 2013/0035797 A1 | 2/2013 | Allen-Ware | |

FOREIGN PATENT DOCUMENTS

| | | |
|---|---|---|
| EP | 1128299 | 8/2001 |
| EP | 1159693 | 12/2001 |

OTHER PUBLICATIONS

J. Heo, "OptiTuner: An Automatic Distributed Performance Optimization Service and a Server Farm Application," Apr. 16, 2009, FeBID 2009, San Francisco, California.

* cited by examiner eMIPS FLASH REPORT eMIPS USED UNIT COST (BEST TO WORST)

| BU: / | UNIT COST USED | UNIT COST CONFIGURED | CTRBS COST EFFICIENCY PERCENTILE |
|---|---|---|---|
| GBDS | $11.84 | $4.73 | 68% |
| BAI | $15.42 | $5.55 | 26% |
| GFT | $24.97 | $7.55 | 27% |
| HRT | $25.50 | $7.54 | 27% |
| CREGS\LC | $26.91 | $6.47 | 29% |
| SSG\MC | $28.51 | $5.78 | 28% |
| IT RISK | $114.66 | $29.18 | 9% |
| CTRBS TOTAL | $25.57 | $6.84 | 28% | eMIPS CONFIG EFFICIENCY (BEST TO WORST)

| BU: / | UTILIZ EFFICIENCY FACTOR | TOTAL eMIPS USED | TOTAL eMIPS CONFIGURED |
|---|---|---|---|
| GBDS | 40.0% | 789 | 1,972 |
| BAI | 36.0% | 2,727 | 7,571 |
| GFT | 30.2% | 37,585 | 124,304 |
| HRT | 29.6% | 6,116 | 20,693 |
| IT RISK | 25.4% | 55 | 217 |
| CREGS\LC | 24.1% | 9,889 | 41,112 |
| SSG\MC | 20.3% | 14,726 | 72,671 |
| CTRBS TOTAL | 26.8% | 71,887 | 268,541 | eMIPS VARIANCE USED/CONFIG FROM LAST WEEK

| BU: / | VARIANCE: CONFIGURED | VARIANCE: USED |
|---|---|---|
| BAI | 0.00 | 159.89 |
| CREGS\LC | -130.88 | 136.26 |
| GBDS | 0.00 | 10.70 |
| GFT | -234.80 | -472.11 |
| HRT | -230.40 | -59.21 |
| IT RISK | 0.00 | 8.79 |
| SSG\MC | -326.56 | -50.72 |
| CTRBS TOTAL | -922.64 | -566.40 | eMIPS MONITORED SERVES (% OF TOTAL BEST TO WORST)

| BU: / | % DATA AVAILABLE | MONITORED SERVERS |
|---|---|---|
| IT RISK | 100.00% | 4 |
| BAI | 98.36% | 62 |
| HRT | 95.42% | 160 |
| GFT | 94.67% | 573 |
| SSG\MC | 90.31% | 430 |
| GBDS | 86.67% | 17 |
| CREGS\LC | 82.42% | 301 |
| CTRBS TOTAL | 91.44% | 1547 |

SELECTION CRITERIA SCENARIOS 1000

| SCENARIO | CPU % 1024 | eMIPS 1026 | GHz 1028 | DISK IO 1030 | NW IO 1032 | MEMORY 1034 |
|---|---|---|---|---|---|---|
| ORACLE DB FARM | <40% | <50% | <1 Ghz | <1 MILLION | <1,000,000 KBs | <8 GB | 1052
| COMMUNITY LINUX | <40% 2-WAY SERVER | <25 | <.65 Ghz | <25k | N/A | <4 GB | 1054
| SOLARIS CONTAINER VMWARE | <40% <40% 2-WAY SERVER | <25 <21.86 | <.65 Ghz 1.2 Ghz MAX <.42 Ghz PREFERRED | N/A N/A | <500,000 KBs <204,000 KBs | <8 GB 3.6 MAX, <2.0 GB PREFERRED | 1056
| zLINUX | <50% | <30 | <1 Ghz | <25k | <1,000,000 KBs | TBD | 1058
| SHARED JAVA FARM | <40% 4-WAY UNIX | | <1 Ghz | <1 MILLION | <1,000,000 KBs | <6 GB | 1060
| SHARED WEB FARM | <20% 2-WAY SERVER | <10.93 | <.21 Hhz | <25k | <500,000 KBs | <1.5 GB | 1062

1050

SYSTEM AND METHOD FOR IMPROVED PROCESSING PERFORMANCE

CROSS-REFERENCE TO RELATED APPLICATIONS

The present application is a Continuation of U.S. application Ser. No. 14/293,150, filed Jun. 2, 2014, which is a Continuation of U.S. application Ser. No. 12/556,801, filed Sep. 10, 2009, now U.S. Pat. No. 8,775,125, the disclosures of which, including the specifications, drawings, and claims, are expressly incorporated herein by reference in their respective entireties.

TECHNICAL FIELD

Embodiments of the invention are related systems and methods for improving processing performance and in particular to a technique for evaluating and improving processing performance over multiple system components.

BACKGROUND OF THE INVENTION

Chief Technology Officers (CTOs), Chief Information Officers (CIOs), and other responsible personnel are frequently tasked with decisions related to the efficiency of infrastructure management. In large organizations, a CTO may be responsible for managing infrastructure within each business unit or other operating environment. Particular choices of hardware and software systems, combinations thereof, and the placement of these systems within a business impact resource efficiency. Thus, CTOs or CIOs for various business units or corporations have a need to gauge cost and performance parameters for infrastructure configuration and infrastructure usage based on implemented decisions.

Traditionally, decision making processes of CTOs have been painstaking, requiring many man-hours to perform calculations related to determining the approximate performance values associated with existing servers, and then determining where to make strategic purchases for new servers and platforms. This problem has existed because the performance of the same component may vary depending upon how that component is implemented in a server, or based upon the operating system or platform the component operates in.

Currently, various benchmarking techniques are available to assess relative performance with respect to computer hardware and computer software. Hardware benchmarking tools may, for example, assess the floating point operation performance of a CPU, and software benchmarks may, for example, run against compilers or database management systems.

Over the years, various measures have been available for different computing performance parameters. Million instructions per second (MIPS) was developed as a standard measure of processing speed. However, MIPS measurements have been found to be heavily dependent on the programming language used and furthermore are not comparable between architectures. Additionally, MIPS measurements are only applicable to mainframes.

Similarly to MIPS, floating point operations per second (FLOPS) also provide a measure of a computer's performance. However, there are many factors in computer performance other than raw floating-point computation speed, such as I/O performance, interprocessor communication, cache coherence, and the memory hierarchy. Furthermore, FLOPS measurements are applicable only to single computing devices.

Benchmarks provide a method of comparing the performance of various subsystems across different chip/system architectures. Types of benchmarking tools may include for example real programs, kernels, component or micro-benchmarks, synthetic benchmarks, parallel benchmarks. Some known benchmarking tools are offered by Business Applications Performance Corporation (BAPCo), Embedded Microprocessor Benchmark Consortium (EEMBC), Standard Performance Evaluation Corporation (SPEC), and Transaction Processing Performance Council (TPC).

Benchmarking tools typically offer the ability to gauge for example, the efficiency of running a program on each of multiple different types of servers or computers. After running the program on a server or computer, the benchmarking tool will typically provider a number for each server or computer that operates as in indicator of the efficiency of that particular server or computer for running the program.

While benchmarking is a useful tool, it fails to provide a single standard for measuring efficiency within an organization across multiple devices and applications and further fails to provide an efficiency indicator based on actual implementation factors. Additional complexities arise for example when visualization is implemented, or when a single device is shared for performance of multiple tasks. A solution is needed for providing a normalized measurement system so that processing performance can be measured and improved where necessary.

With improved knowledge of infrastructure configuration and usage costs and the fluctuations in these costs, responsible parties would be able to assess cost and performance impacts of actions such as buying smaller and cheaper servers, reducing the number of applications running on a server, using lower cost CPUs, etc. However, no standard measure is available for gauging these costs and fluctuations across disparate environments incorporating disparate technologies. Accordingly, a solution is needed for normalizing the measurements across disparate technologies.

A solution is further needed in the industry for evaluating performance capacity of various computing platforms in relation to the cost of those platforms, to facilitate that managerial and budgeting decision-making. Accordingly, a methodology is needed that allows comparison across a multiple of different platforms from an infrastructure perspective so different platforms, different CPUs, different CPU cycle speed, different server pipes, etc. are evaluated on an equivalent level in terms of cost and performance.

SUMMARY OF THE INVENTION

In one aspect of the invention, a computer-implemented method is provided for improving processing performance for a group of computing resources. The method is implemented on at least one computer having a processor and includes calculating a benchmark for each computing resource in the group of computing resources. The method additionally includes implementing the processor for normalizing the benchmark across the group of computing resources to determine a number of performance units for each computing resource. The method further includes providing a graphical user interface for facilitating visual comparison of processing performance indicators for multiple computing resources in the group of computing resources and reconfiguring at least some of the computing resources represented on the graphical user interface based on the comparison.

In another aspect of the invention, a computer-implemented system is provided for analyzing processing performance for a group of computing resources. The system comprises at least one computer having a processor. A performance indicator calculation engine implements the processor for calculating a processing performance indicator for each computing resource in the group of computing resources, the calculation based on a normalized benchmark. The system additionally includes graphical user interface presentation tools for implementing each calculated processing performance indicator to provide a visual comparison for comparing processing performance for multiple computing resources in the group of computing resources.

In another aspect of the invention, a computer-implemented method is provided for improving processing performance for a group of computing resources. The method is implemented on at least one computer having a processor and accessing at least one data storage area. The method includes calculating a benchmark for each computing resource in the group of computing resources. The processor normalizes the benchmark across the group of computing resources to determine a number of performance units. The method further includes determining a usage cost for each computing resource based on data collected from the data storage area and creates a processing performance indicator by dividing the usage cost by the normalized performance units. Additionally, the method includes providing a visual comparison for comparing processing performance indicators for multiple computing resources in the group of computing resources and reconfiguring computing resources based on the comparison.

In another aspect of the invention, a computer-implemented system is provided for analyzing processing performance for a group of computing resources. The system comprises at least one computer having a processor and accessing at least one data storage area, a benchmarking engine for calculating a benchmark for each computing resource in the group of computing resources, and normalization components for implementing the processor for normalizing the benchmark across the group of computing resources. The system further includes a data extraction system for extracting usage costs from the data storage area for each computing resource in the group of computing resources and a performance indicator calculation engine for calculating a processing performance indicator by dividing the usage cost by the normalized benchmark. The system additionally includes an efficiency analysis engine for implementing the processing performance indicator for each computing resource to provide an analysis of overall system efficiency.

BRIEF DESCRIPTION OF THE DRAWINGS

The present invention is described in detail below with reference to the attached drawings figures, wherein:

FIG. 9 illustrates a user interface showing processing performance reports in accordance with an embodiment of the invention; and FIG. 10 illustrates system guidelines for improving performance in accordance with an embodiment of the invention.

DETAILED DESCRIPTION OF PREFERRED EMBODIMENTS

Embodiments of the present invention are directed to a method and system for analyzing and improving processing performance through comparison of computing resources across multiple variables in a graphically descriptive format.

Figure 1:
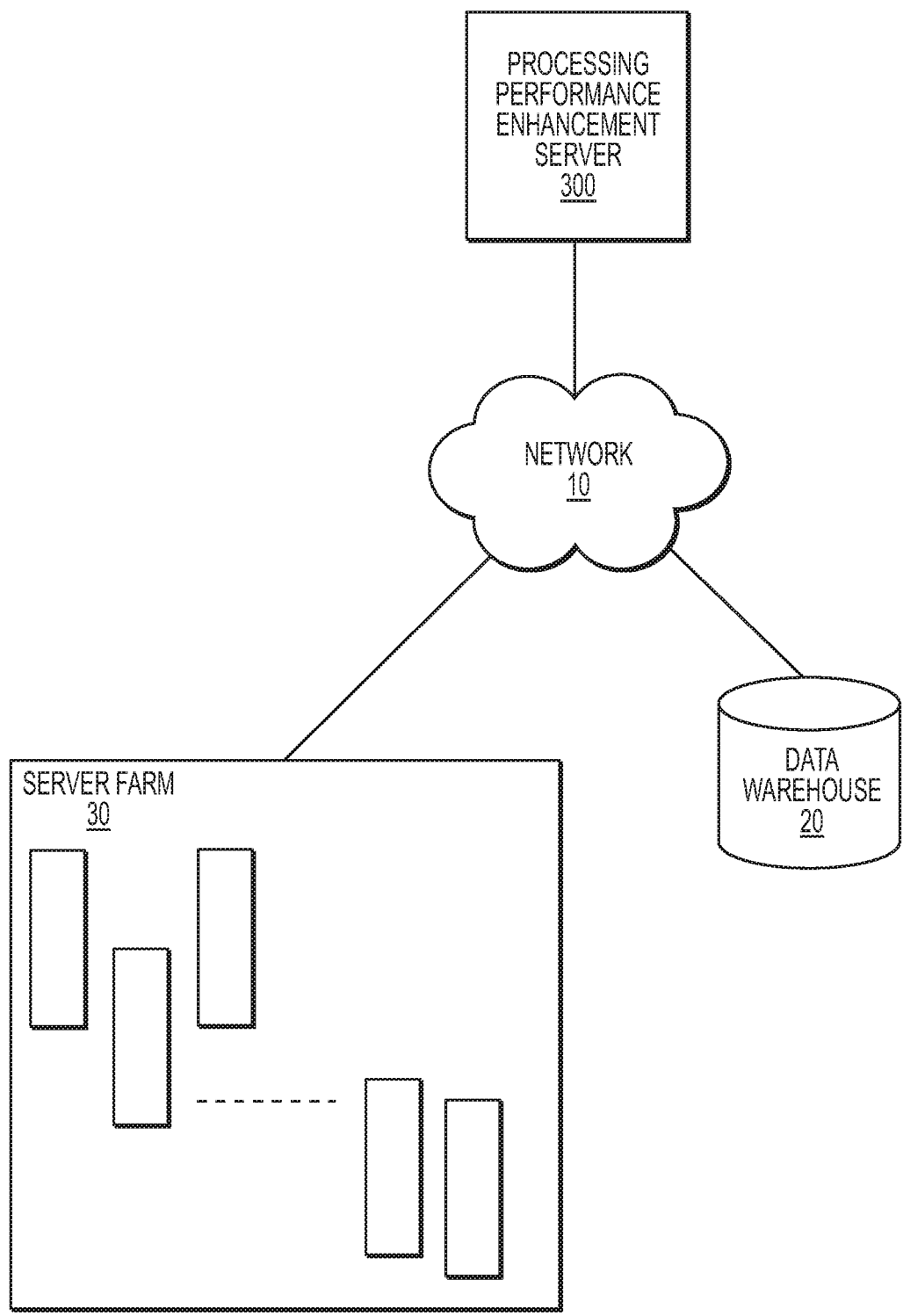
FIG. 1 is a block diagram illustrating an operating environment for a processing performance enhancement system in accordance with an embodiment of the invention.

FIG. 1 is a block diagram illustrating an operating environment for a processing performance enhancement system in accordance with an embodiment of the invention. A processing performance enhancement server 300 may be connected over a network 10 with a group of servers 30 and a data warehouse 20.

The processing performance enhancement server 300 may be or include a computer or group of computers equipped with software modules that, when executed are able to facilitate improvement in the use of resources contained within the group of servers 30. The performance enhancement server 300 calculates a number of performance measurement units associated with each server and uses the calculated number to analyze server operation and enhance efficiency. The performance units calculated may differ for example based on computing hardware specifications and types of software running on the provided hardware. Completely different performances may be produced based on, for example, the type of computer and processing chip, the type of operating system, and the type of application program running. For example, different types of chips perform differently for graphics applications, games, photo applications, etc. Accordingly, the performance enhancement server 300 is able to operate across these dimensions in order to gauge performance in the actual usage environment. The performance enhancement server 300 can evaluate the processing potential of a configuration and determine whether the capacity is sufficiently utilized. The details of the system will be described below in connection with the remaining figures.

The group of servers 30 may be or include a large quantity of resources contained within an organization or a division within an organization, such as a line of business. The group of servers 30 may be or include a comprehensive set of software and hardware resources and may include hundreds or thousands of servers. The servers 30 may act in various capacities. For example, the servers 30 may be application servers, database servers, or web servers. The group of servers 30 may further include virtual instances of a server, shared servers, and dedicated servers. Thus, the performance enhancement server 300 described above can evaluate performance across the multiple servers 30 allocated to a single application or a single server running one or more applications. In the instance of a virtual server, a single server or computer may be operated to appear as multiple computers without having to incur the multiple different hardware components. Thus, the single computer may look like ten different computers and run different applications, different operating systems, etc. so it provides a layer of virtualization. Typically, each server within the group of servers 30 may have a collection agent or other similar mechanism for gathering server data for delivery to the data warehouse 20.

The data warehouse 20 may in embodiments of the invention be a global data warehouse serving tin entire organization. Alternatively, the data warehouse 20 may include multiple data warehouses to be provided within each of multiple divisions of an organization. Thus, in embodiments of the invention, the collection agent from each server or group of servers reports and populates performance information into a data warehouse 20. This performance information becomes available to the processing performance enhancement server 300.

The network 10 may include various networks in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications.

Figure 2:
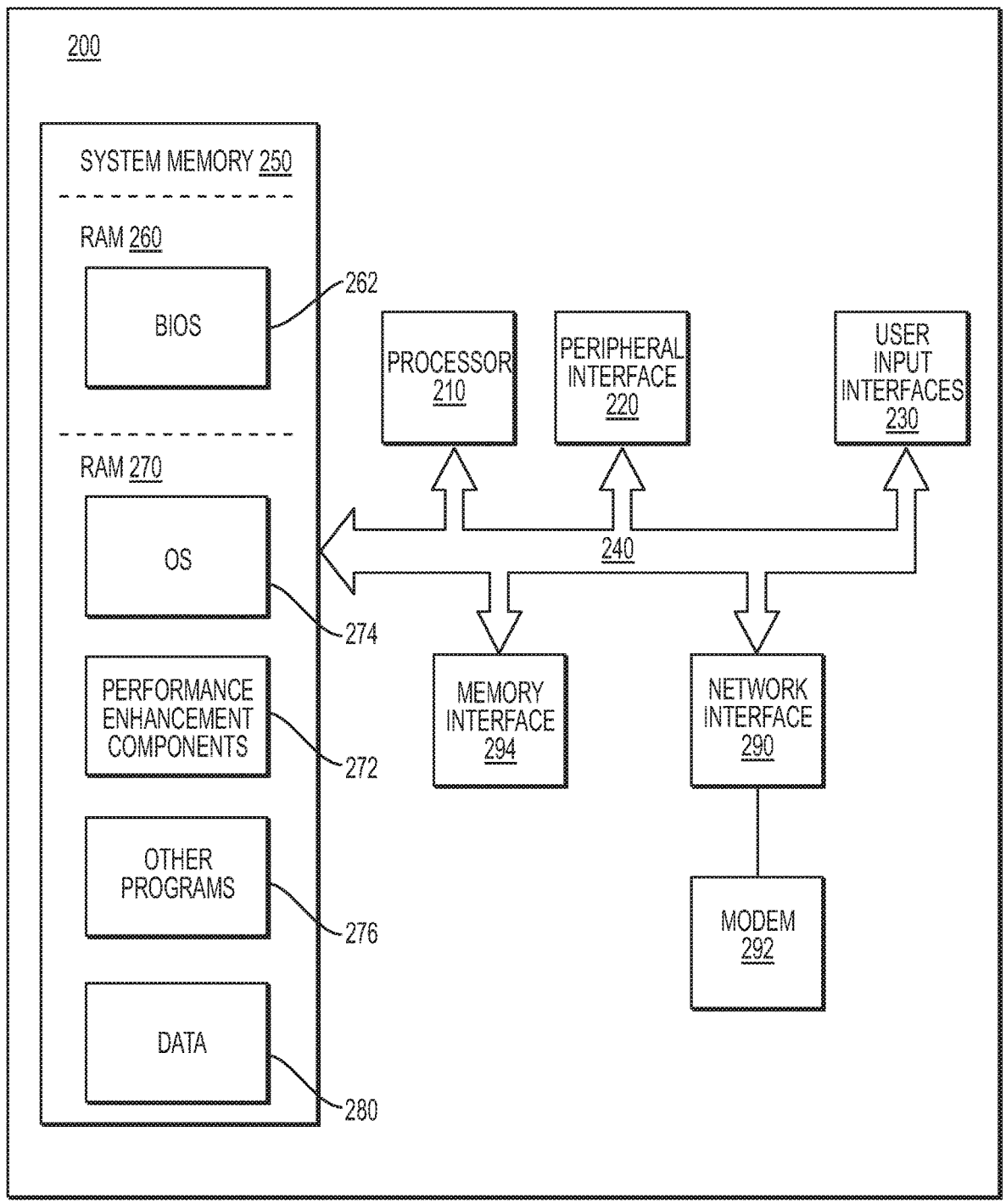
FIG. 2 is a block diagram illustrating a computer system implementing processing performance enhancement components in accordance with an embodiment of the invention.

FIG. 2 is a block diagram illustrating a computer system 200 implementing processing performance enhancement components 272 in accordance with an embodiment of the invention. This configuration is merely exemplary and should not be construed as limiting. The computing system 200 may include a processing unit 210, a peripheral interface 220, a user input interface 230, a system bus 240, a system memory 250, a network interface 290, a connected modem 292, and a memory interface 294. The system bus 240 may be provided for coupling the various system components.

Computers typically include a variety of computer readable media that can form part of the system memory and be read by the processing unit. By way of example, and not limitation, computer readable media may comprise computer storage media and communication media. The system memory 250 may include computer storage media in the form of volatile and/or nonvolatile memory such as read only memory (ROM) 260 and random access memory (RAM) 270.

A basic input/output system (BIOS) 262, containing the basic routines that help to transfer information between elements, such as during start-up, is typically stored in ROM 260. RAM 270 typically contains data and/or program modules that are immediately accessible to and/or presently being operated on by processing unit. The data or program modules may include an operating system 274, campaign specification components 272, other program modules 276, and program data 280. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 250 includes at least one set of instructions that is either permanently or temporarily stored. The processor 210 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The processing performance enhancement system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 210 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 230 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 220. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Networks may be implemented as described above in connection with FIG. 1. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 3:
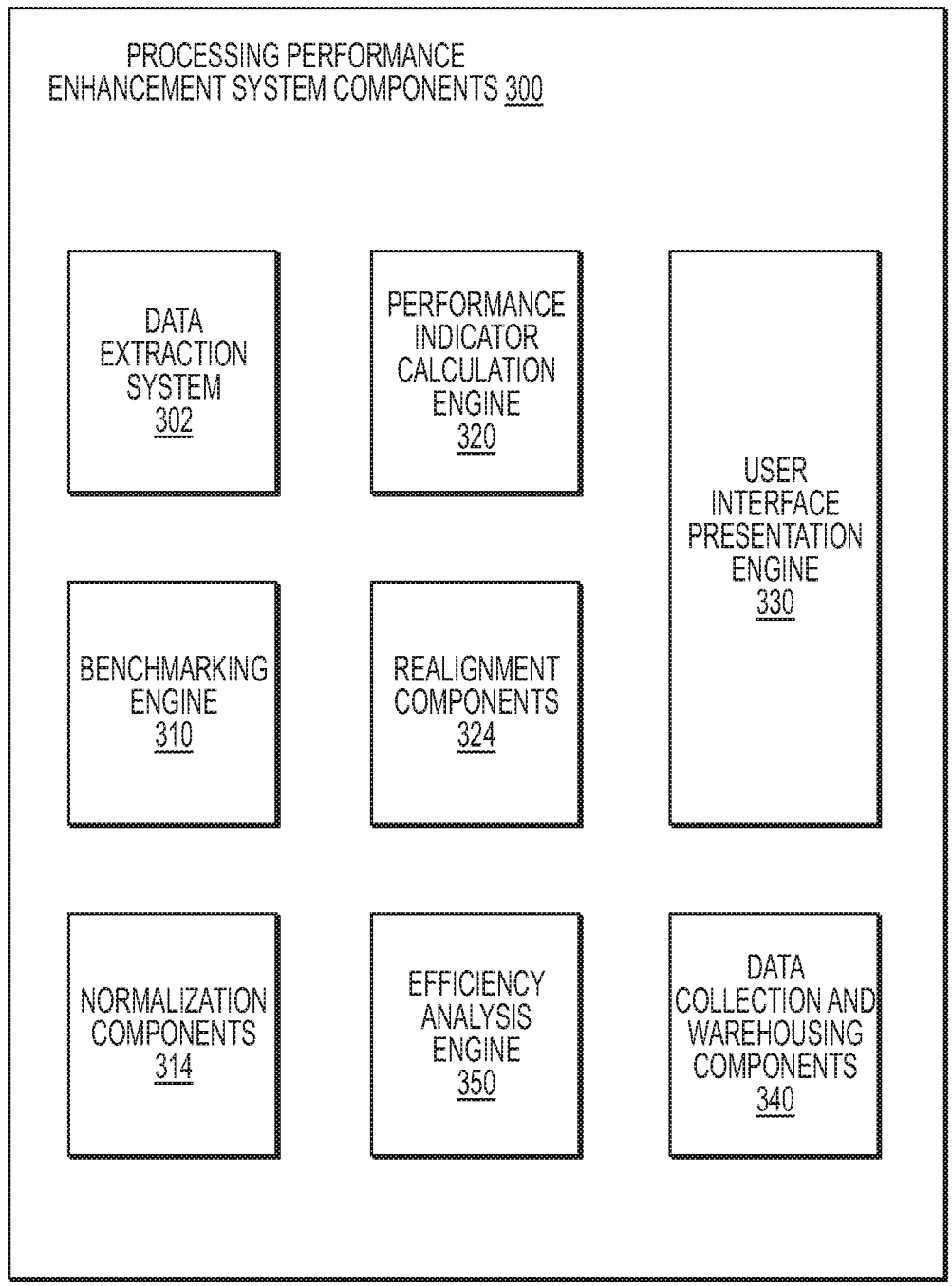
FIG. 3 is a block diagram illustrating processing performance enhancement system components in accordance with an embodiment of the invention.

FIG. 3 is a block diagram illustrating processing performance enhancement system components 300 in accordance with an embodiment of the invention. The processing performance enhancement system components 300 may include a data extraction system 302, a benchmarking engine 310, normalization components 314, a performance indicator calculation engine 320, realignment components 324, and efficiency analysis engine 350. The processing performance enhancement system components 300 may additionally include a user interface presentation engine 330 and data collection and warehousing components 340.

The data extraction system 302 may be utilized to extract performance data from the global data warehouse as described above with reference to FIG. 1. The data collected by the data extraction system 302 is implemented for analysis of existing performance in order to improve future performance.

The benchmarking engine 310 may implement a known benchmarking technique in order to provide a benchmark for each device or system within the collection of servers being analyzed. In a preferred embodiment, the benchmarking tool may include a kernel-level benchmarking tool, such as source code files available from SPEC's CPU benchmarking tools. These files are written in a standard programming language, which is then compiled for each particular CPU architecture and operating system. Thus, the performance measured is that of the CPU, RAM, and compiler, and does not test I/O, networking, or graphics. The benchmarking engine 310 produces a raw number which fails to take into consideration various factors such as whether resources are shared, virtual, or dedicated, and the frequency of use of the measured resources. The benchmarking engine 310 measures the capability of server without regard for actual implementation of the server.

The normalization components 314 are implemented after a benchmarking number is determined. The benchmarking number is multiplied by a consistent multiplier value in order to achieve a base number of performance units on that device. In cases where a system has multiple processors or multiple cores, the benchmarking number may be also multiplied by the number or processors or cores present, if applicable. In embodiments of the invention, then number produced by the Spec Int 2006 benchmarking tools multiplied by four provides an approximation of number of performance units for a device.

The performance indicator calculation engine 320 utilizes the cost of the server or system and divides it by the number of calculated performance units in order to determine a cost per performance units configured. This value illustrates the cost to make a given number of performance units available to applications. Cost of performance units configured may also be referenced as "eMIPS configured".

In order to determine a cost per performance units used (eMIPS used), the actual usage of the server must be considered. The number of performance units may also be multiplied by a weighting factor that is based on the type of server or use the server will be put towards, such as a shared server, dedicated server, virtualized server, and the like. In the example of a shared server, the weighting factor could be a fraction with the denominator equal to the number of shared users on the server. Furthermore, the costs used in the calculation may include actual monthly operating costs for the configuration. Accordingly, if a particular server or system is used by two applications or two disparate businesses a weighting factor of 0.5 would be applied to each. In the instance of a virtual server, the weighting factor applied would depend upon the extent to which the server is shared between businesses. Thus, if the server is not shared, the weighting factor would be equal to one. If the server shared with ten others, the weighting factor for this particular would be equal to 1/10. Additionally, the weighting may be altered depending upon how much device time is spent on a particular application. For example, if 80% of the CPU time is spent on application A and 20% of CPU time is used for application B, the weighting may be distributed accordingly.

Thus, although a single weighting factor is applied to calculate the number of performance units for each device, additional weighting factors may be implemented for cost calculations.

The data collection and warehousing components 340 may be implemented to collect performance data on a regular basis. The data may be collected periodically, for example, at monthly intervals. Operation of the processing performance enhancement components 300 may cause the data to be automatically retrieved through the data extraction system 302. The data extraction system 302 may execute a SQL query to retrieve the data. These data collection components 340 and data extraction components 302 may be disposed at other locations within an organization. For example, data may be collected by each individual server and deposited in the global data warehouse shown in FIG. 1. In instances in which historical data is unavailable, such as when new equipment is installed, data will generally be gathered from the vendor or manufacturer and deposited in the global data warehouse.

The efficiency analysis engine 350 analyzes the performance unit calculations as they are applied to a fleet of systems and servers such as those shown in FIG. 1. The analysis is visually provided through a graphical user interface that plots each of the various systems and servers on a graph that has variable axes displayed by the user interface presentation engine 330. The efficiency analysis engine 350 and user interface presentation engine 330 allows high level managers, such as the CIO, of a company to visualize infrastructure patterns rapidly without the weeks of analysis that had traditionally been necessary. In one implementation, the efficiency analysis engine 350 compares the performance units against the input-output ("I/O") demands on the server. Other implementations can compare memory usage and other stored statistical information about the servers.

Using the efficiency analysis engine 350 and user interface presentation tools 330, it is easy for a manager to see the entire installed base of servers and determine what servers or systems may be underutilized. The efficiency analysis engine users to filter displayed data points by various methods, including by business unit (if the fleet involves multiple business units), by type of server (dedicated, shared, virtualized, etc), or by server use (web-server, database, application server). The efficiency analysis engine 350 further allows a user to select or click on individual data points to discover more information about that particular server. Individual server information may include a line graph of usage and efficiency in a performance units measure over a period of time, such as a day, in order to understand cyclical usage of the system. The efficiency engine 350 may even determine if two servers run applications with negatively correlated cyclical usage, and propose running those applications in a shared or virtualized environment on a single server to maximize efficiency.

The user interface presentation engine 330 is provided for facilitating more informed infrastructure decisions. The user interface presentation engine 330 is configured to allow rapid identification or infrastructure patterns by presenting the analysis provided by the efficiency analysis engine 350.

The user interface presentation engine 330 may present a graph to the user plotting for example. CPU utilization percentage against input/output (I/O) or rate of which the system or device moves data.

Thus, assuming the data collection components 340 measure a thirty-day rolling average of CPU and IO for every single system in the environment, this information is portrayed as data point on the graph produced by the user interface presentation tools 330. This tool now allows a user to see, for example, that out of one hundred servers in the environment, thirty of them are clustered underneath the 10% CPU line and have an I/O of less than 800 kilobytes per second. If these servers are disposed on an infrastructure with high performance units costs, the user can immediately determine that efforts need to be made to focus on these thirty servers. Thus, clusters of points within a presented graph or points falling outside of the clusters will be made targets for decisioning. Thus, merely by viewing the graphical user interface, a user will know that thirty servers should be moved, for example to a virtualized environment that could have more CPU utilization.

Thus, the user interface presentation engine 330 offers one way to visualize the entire environment in terms of performance. A user can immediately determine whether an infrastructure is operating at the optimum levels, which often fall between 40% and 60% CPU utilization. Outlying data in points are readily identified. Preferably, the user interface presentation engine 330 allows selection of data points, such that if a user hovers over a data point, identifying information such as the server name, the computer name, production, development or disaster recovery information will be displayed. Selection of the data point may reveal additional information, such as for example, usage memory capacity, location, etc.

Preferably, the user interface presentation engine 330 offers the capability to filter on specific computing resources. Thus, a user may want to display, for example, only web servers. The user may be able to select web servers. The user may further be able to filter by such factors as business unit or operating environment.

Thus, the user interface presentation engine 330 enables a user to immediately identify usage scenarios. Accordingly, a user can immediately identify for example if 90% of the web servers on the system are only using 12% or less CPU. Through this identification, the user can determine optimal scenarios, such as opportunities to consolidate data points into a virtualized server or combine multiple data points into one computer.

Preferably, the user interface presentation engine 330 will provide the capability to display the servers, or system resources as data points relative to multiple variables, for example ten to twenty different variables. In preferred embodiments, all of these variables can be defined on the x-axis or y-axis of a presented graph. In embodiments of the invention, the analysis and presentation components 330 and 350 may be one or more software modules executed by a processor. The software modules may be written in a language such us Adobe Flex, JAVA, or C++.

The realignment components 324 may be provided to alter usage of analyzed devices and systems based on the analysis performed by the efficiency analysis engine 350. New hardware and implementation decisions may be made by entering calculations into the realignment components 324 and setting usage variables for the new system. Every application runs on a device that typically needs to be changed approximately every three years due to the absence of continuing support for the hardware. Accordingly, every time a device needs replacement, the realignment components 324 offer a tool for evaluating alternatives. Additionally, through interaction with the user interface presentation engine 330, data points will be displayed for the prospective hardware purchase (or purchases) so an educated purchase decision may be made. The calculation of performance units becomes a decision support tool.

Figure 4:
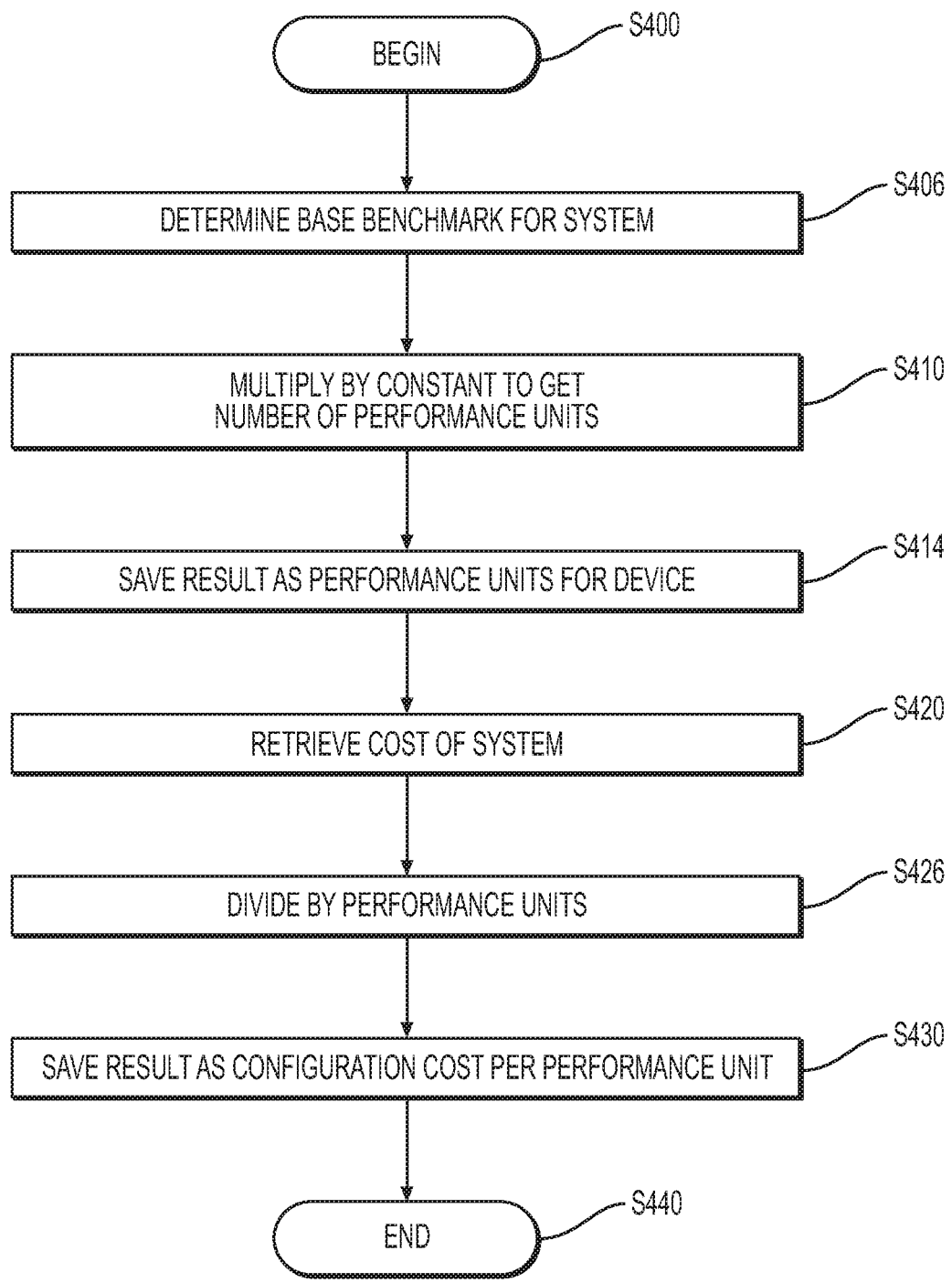
FIG. 4 is a flow chart illustrating calculation of performance units per system configured in accordance with an embodiment of the invention.

FIG. 4 is a flow chart illustrating calculation of performance units per system configured in accordance with on embodiment of the invention. The method begins in S400 and the system determines a base benchmark in S406. In S410, the system multiplies the base benchmark by a constant to arrive at a number of performance units. In S414, the system saves the result as the performance units for the device. In S420, the system retrieves the cost of the device. In S426, the system divides the retrieved cost by the calculated number of performance units. In S430, the system saves the result as a configuration cost per performance unit for the selected device. The method ends in S440.

Figure 5:
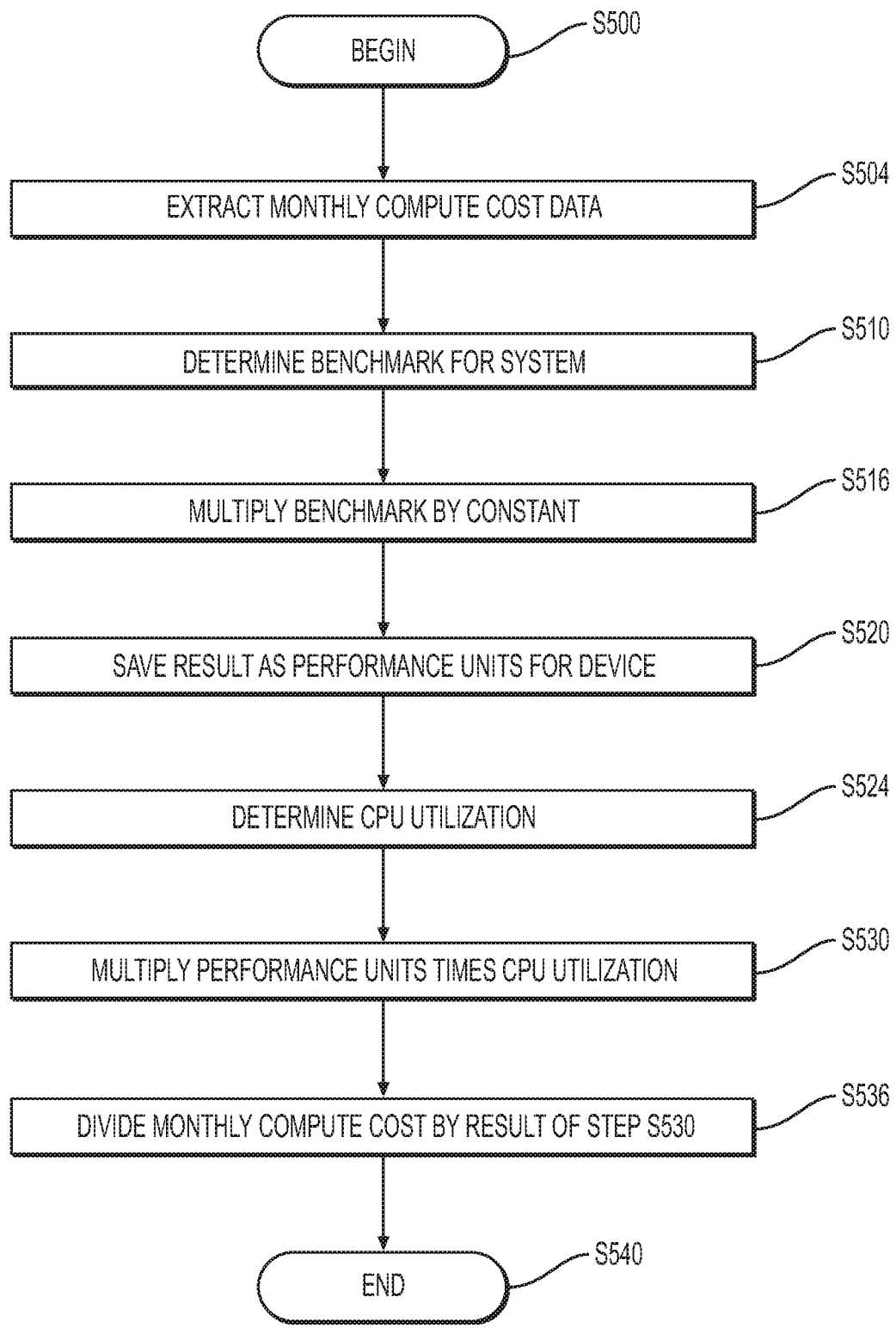
FIG. 5 is a flow chart illustrating a method for determining performance units per system use in accordance with an embodiment of the invention.

FIG. 5 is a flow chart illustrating a method for determining performance units per system use in accordance with an embodiment of the invention. The method begins in S500. In S504, the system extracts monthly compute cost data for a selected device. In S510, the system determines a benchmark for the selected device. In S516, the system multiplies the benchmark by a constant and in S520, the system saves the result as performance units for the device. In the instance of shared usage, the performance units may also be multiplied by a weighting factor In S524, the system determines CPU utilization. In S530, the system multiplies performance units by CPU utilization and in S536, the system divides the monthly compute cost by the result of S530. The method ends in S540.

Thus, FIG. 4 illustrates calculation for cost of performance units configured and FIG. 5 illustrates cost per performance units utilized. The cost per performance used will also be higher because resources are never 100% utilized. Typically, utilization will be less than 50%. Thus, with this information, the price of hardware becomes less of a decision driver and actual usage parameter assume greater significance.

Figure 6:
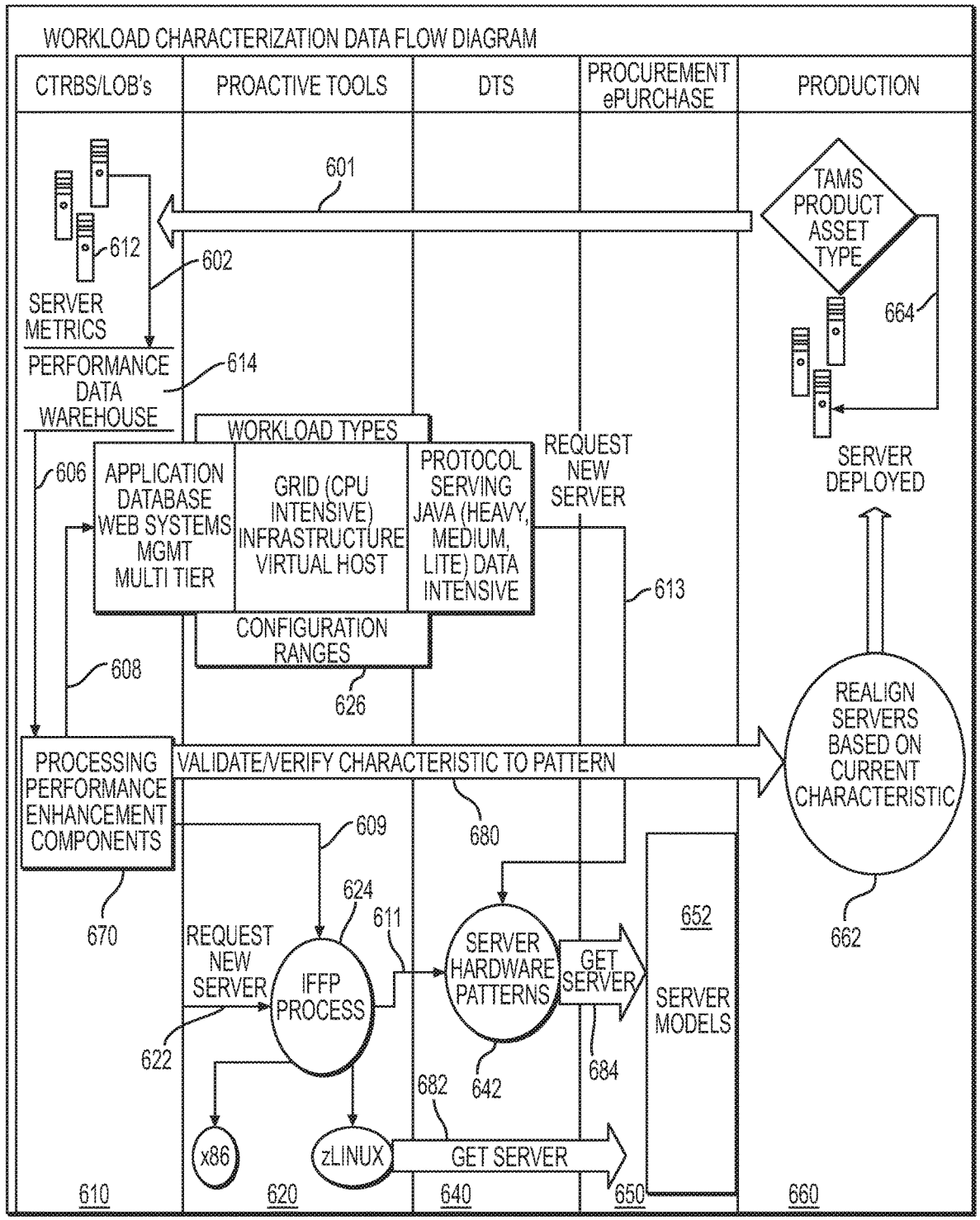
FIG. 6 is a work flow diagram illustrating system operation in accordance with an embodiment of the invention.

FIG. 6 is a work flow diagram illustrating workflow 600 in accordance with an embodiment of the invention. A line of business (LOB) 610 may include server metrics 612 that are deposited into a data warehouse 614. A performance processing enhancement user interface 670 may also be provided at the LOB 610.

Proactive tools 620 may include the servers being measured in their operating environment 626. Thus, workload types and configuration ranges may vary and one or more processes, such as IFFP process 624 may run in the environment.

A data transformation services layer 640 may include server hardware patterns 624 and a procurement layer 650 may include server models 632. A production layer 660 may include servers deployment 664 based on realignment executed at 662.

In operation, the data warehouse 614 may store data as shown by arrow 602 collected from the servers. The processing performance enhancement system 670 may extract data from the performance data warehouse 614 as illustrated by arrow 606. As illustrated by arrows 608 and 609, the processing performance enhancement system 670 interacts with proactive took 620, which in turn deliver information as illustrated by arrows 611 and 613 to server hardware patterns 642. Information is delivered as illustrated by arrows 682 and 684 to procurement layer 650. Ultimately, the processing performance enhancement system 670 verifies characteristics as illustrated by arrow 680 to allow for realignment of servers based on characteristics at 662. Data from realigned servers 664 may be collected and forwarded to the LOB as illustrated by arrow 601.

FIGS. 7A-7D illustrate user interface screens provided by the system in accordance with an embodiment of the invention.

Figure 7A:
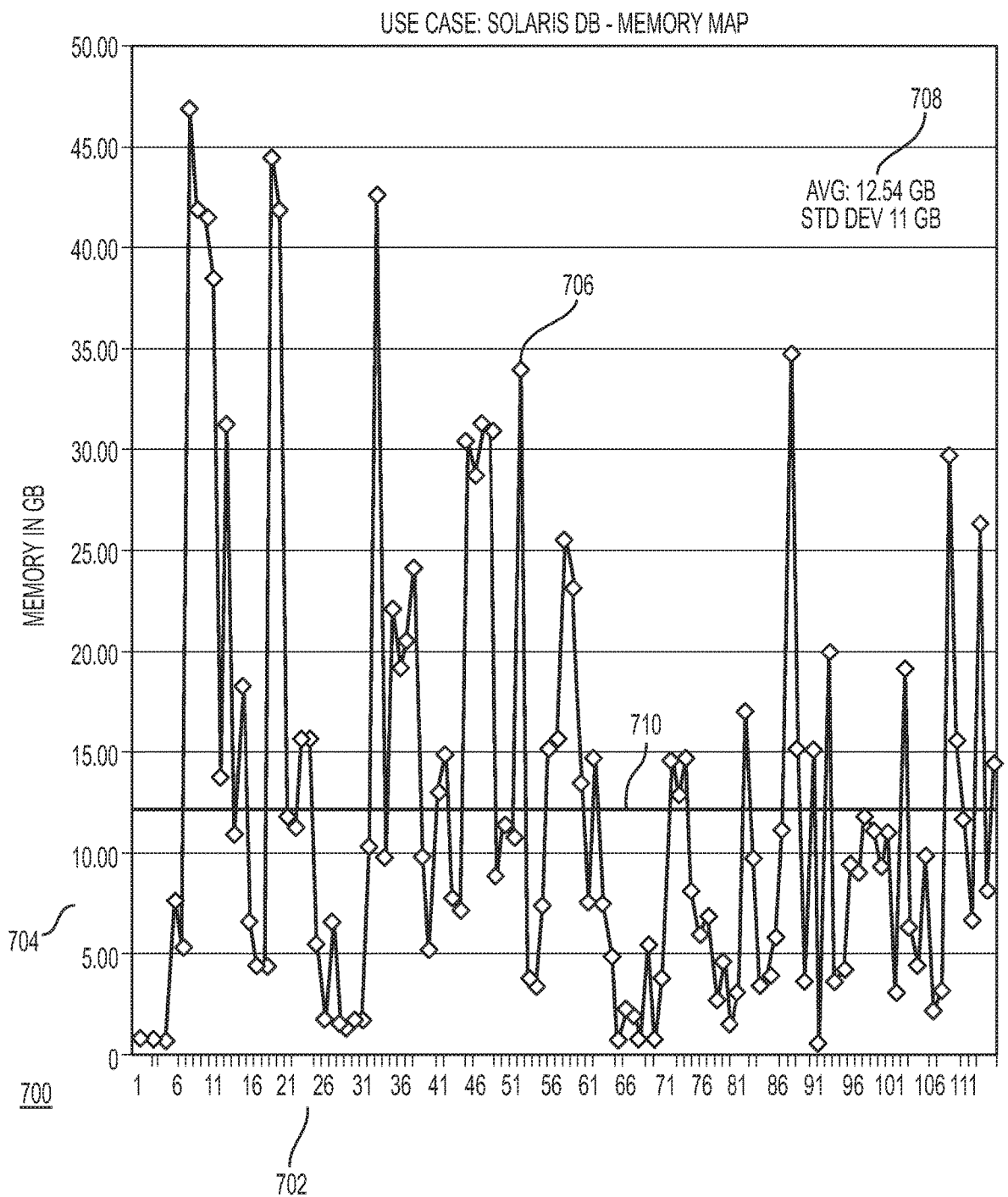
FIGS. 7A-7D illustrate user interface screens provided by the system in accordance with an embodiment of the invention.

FIG. 7A illustrates a screenshot 700 illustrating time along the x-axis and memory in GB along the y axis. Data points 706 represent servers or devices in the system. An average and standard deviation is displayed at 708. Line 710 may be drawn to better illustrate which values fall inside and outside of accepted limits.

Figure 7B:
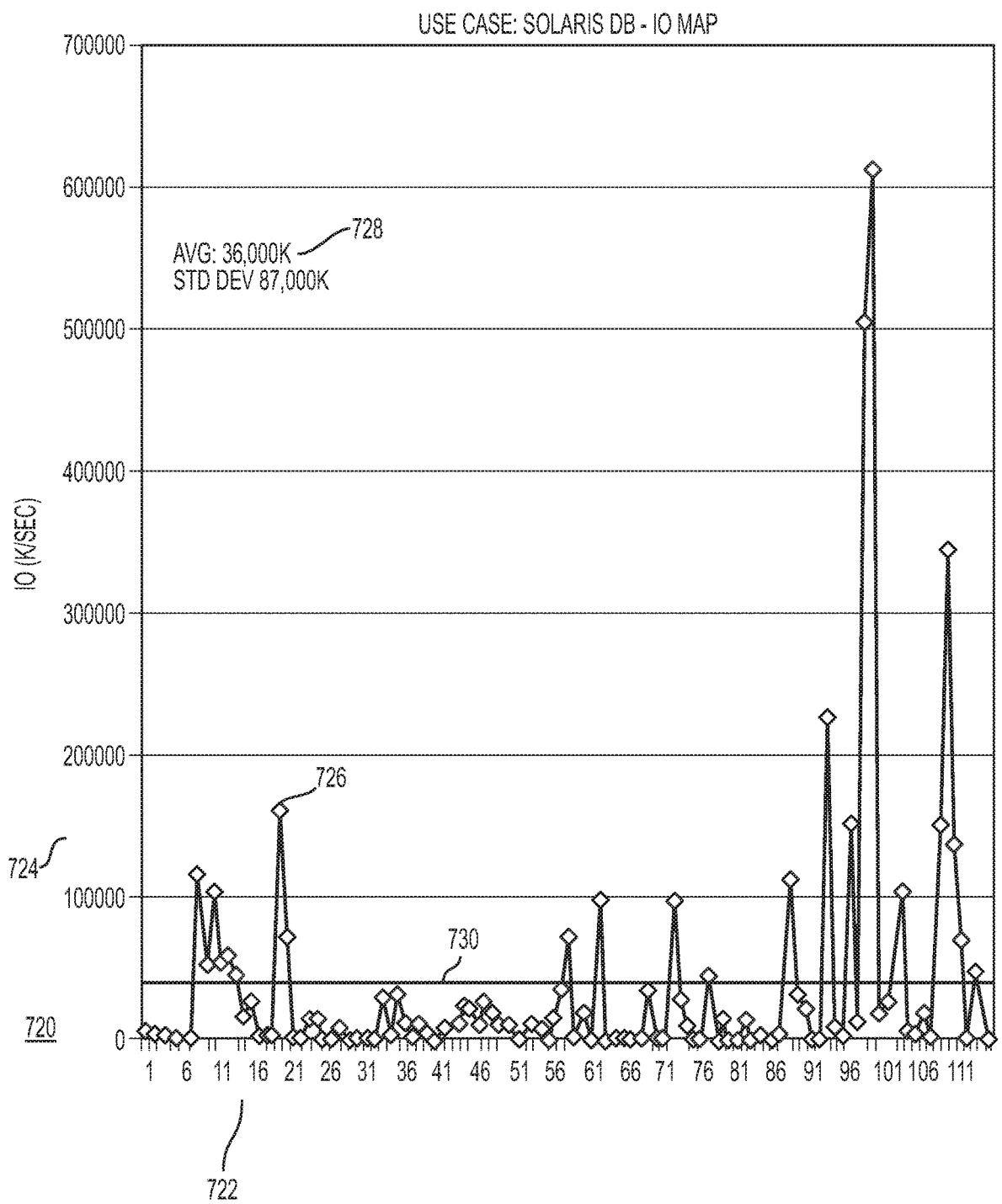

FIG. 7B illustrates a user interface screen 720 illustrating time along the x-axis and IO along the y axis. Data points 726 represent servers of devices in the system. An average and standard deviation are displayed at 728. A line 730 may be drawn to better illustrate which values fall inside and outside of established limits.

Figure 7C:
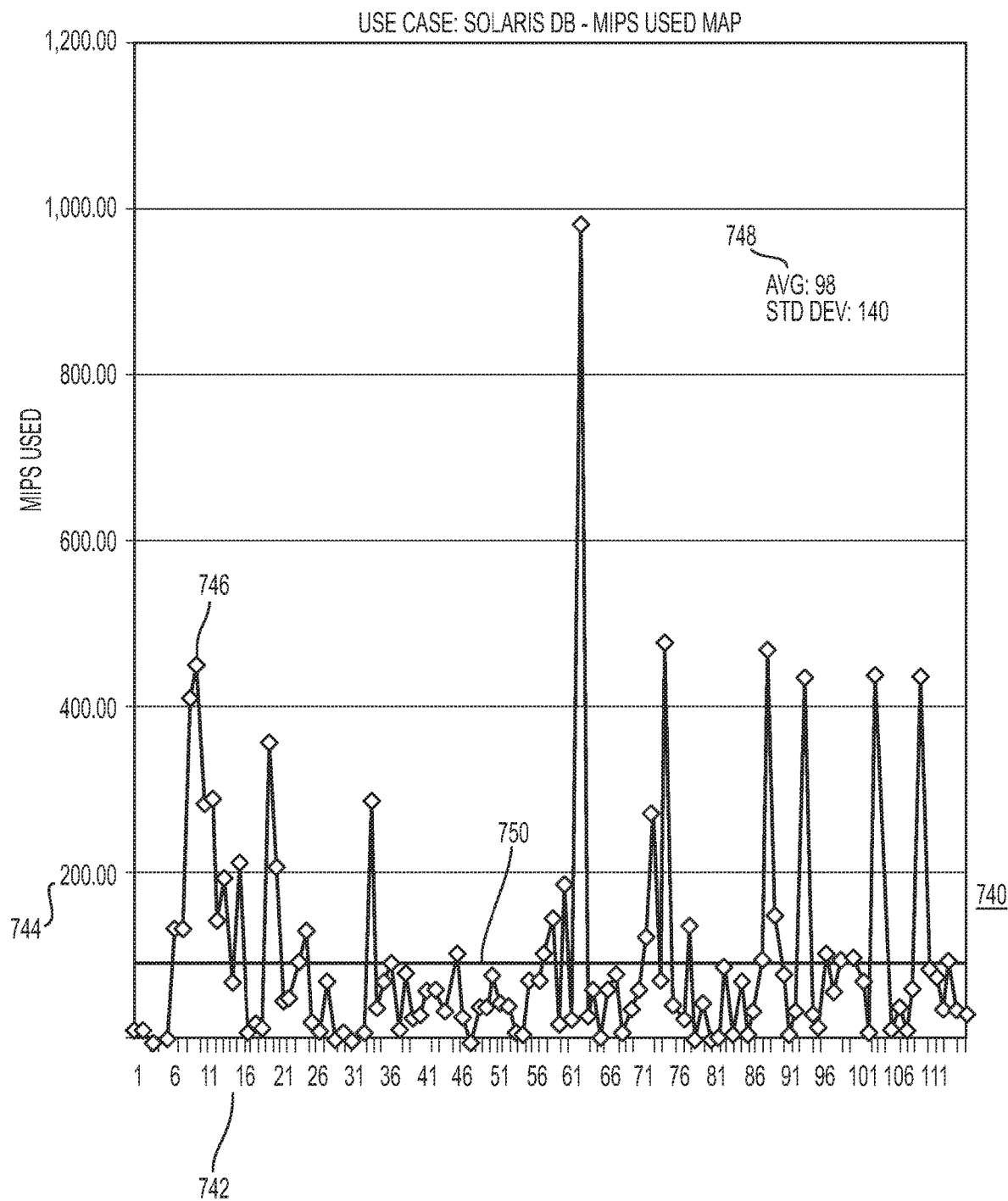

FIG. 7C illustrates a screen shot 740 illustrating time along the x-axis and MIPS used along the y axis. Data points 746 represent servers or devices in the system. An average and a standard deviation are displayed at 748. Line 750 is provided to better illustrate which values fall inside and outside of established limits.

Figure 7D:
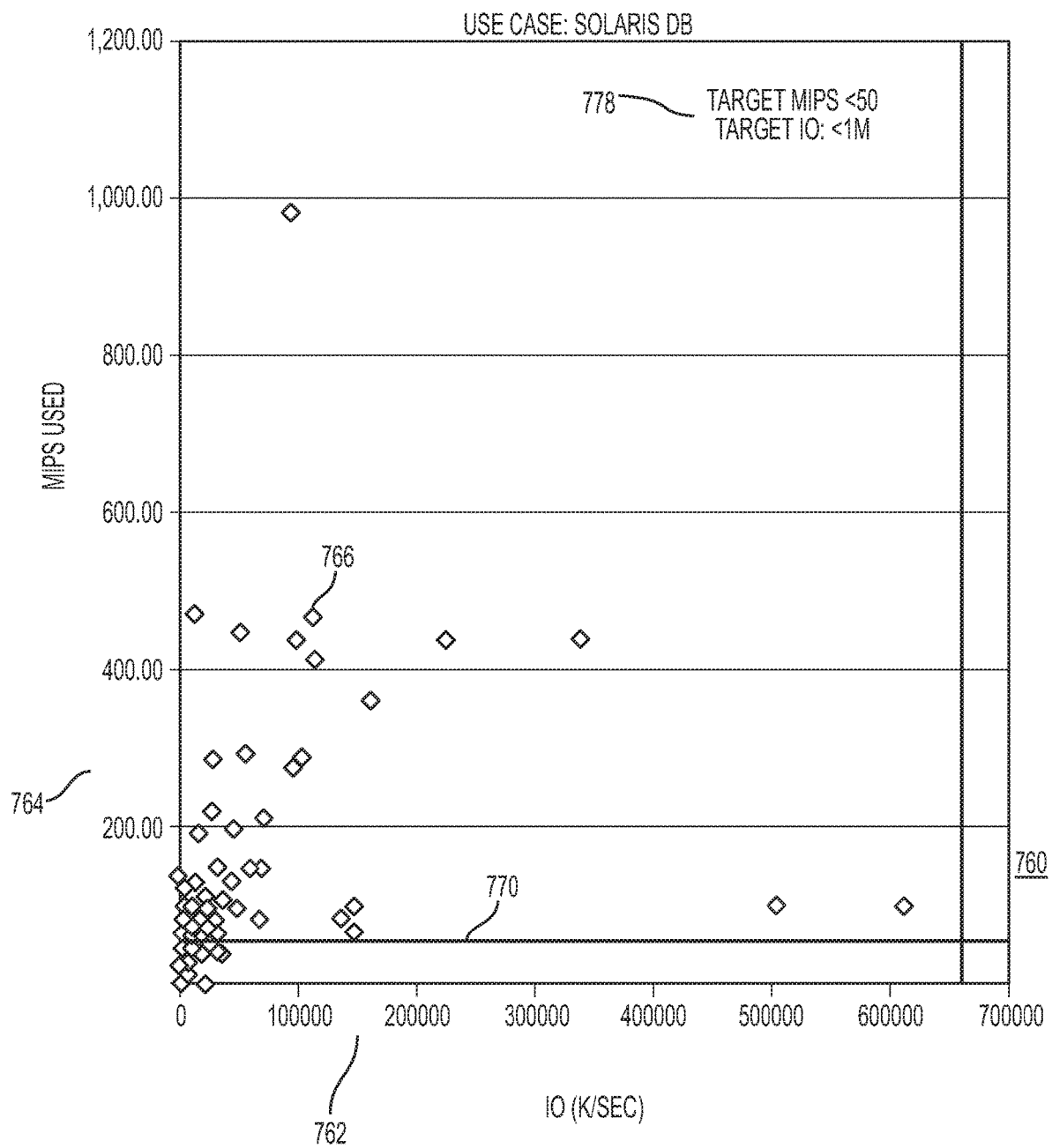

FIG. 7D illustrates a screen shot 760 having IO along the x axis and MIPS used along the y axis Data points 766 represent servers or devices in the system. An average and standard deviation are displayed at 778. Line 770 is displayed to better illustrate which values fall inside and outside of established limits.

Figure 8:
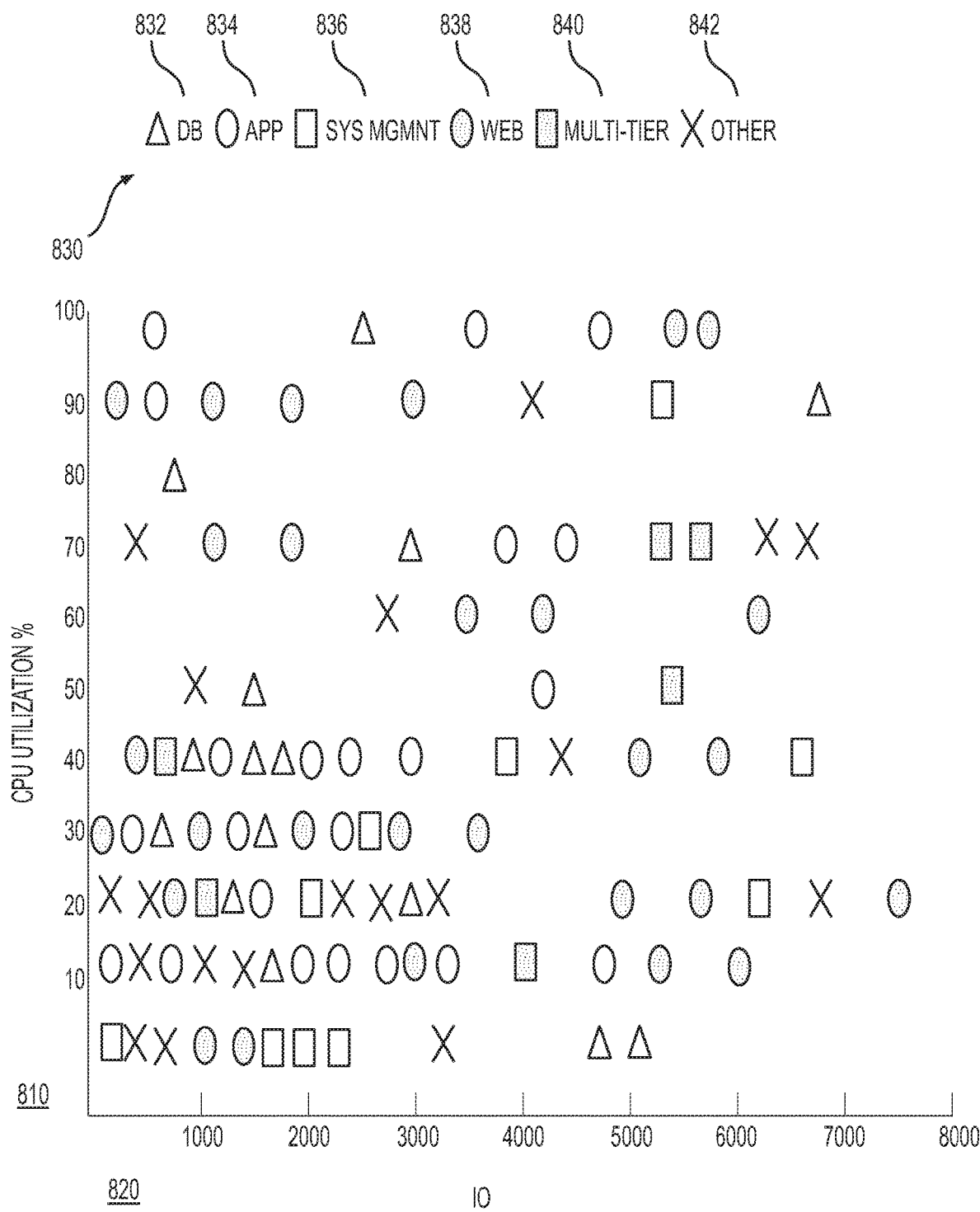
FIG. 8 illustrates a user interface screen for facilitating evaluation of system performance in accordance with an embodiment of the invention.

FIG. 8 illustrates a user interface screen for facilitating evaluation of system performance in accordance with an embodiment of the invention. This screen illustrates CPU utilization percentage along a y-axis 810 and IO throughput along an x-axis 820. Types of configurations may be represented by symbols 830. For example, database configurations may be represented by triangle 832, applications by circle 834, systems management by rectangle 836, web by dark circle 838, multitier by dark rectangle 840, and other by "x" 842. The distribution of the aforementioned symbols on the graph facilitates compliance with optimal system performance parameters.

FIG. 9 illustrates a user interface showing processing performance in accordance with an embodiment of the invention: Reports 900 may be utilized to rank configurations based on various parameters. For example, report 910 ranks performance units used per unit cost from best to worst. The unit 910 is ranked by unit cost used 914, unit cost configured 916 and cost efficiency percentile 918. Report 930 ranks performance units configured in efficiency from best to worst. Each unit 932 displays utilized efficiency factor 934, total performance units used 936, and total performance units configured 938. A report 950 may be provided to show variance in performance. Units 952 are displayed by variance in configured performance units 954 and variance in used performance units 956. A report 970 may be used to rank servers monitored. The business unit is shown at 972, % data available 974, and number of monitored servers at 976.

FIG. 10 illustrates system guidelines for improving performance in accordance with an embodiment of the invention. Selection criteria scenarios 1000 are listed based on the scenario or configuration 1050 and variables including CPU percentage utilization 1024, processing performance units 1026, GHz 1028, disk IO 1030, NW IO 1032, and memory

1034. Preferred values are shown for an Oracle DB farm 1052, Commodity Linux 1054, Solaris Container VMWare 1056, zLinux 1058, shared Java frame 1060, and shared web farm 1062. In embodiments of the invention, a responsible party may evaluate compliance with these ranges based on the graphs presented by the user interface presentation components. Furthermore, the realignment components 324 may automatically recommend configuration changes based on the comparison.

While particular embodiments of the invention have been illustrated and described in detail herein, it should be understood that various changes and modification might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented method for improving processing performance for a group of computing resources, the method implemented on at least one computer having a processor at a computer system, the method comprising:
    accessing at least one data storage, the data storage containing performance information data associated with a computing resource of the group of computing resources;
    retrieving the performance information data from the data storage;
    calculating, using a benchmarking engine, a benchmark raw number for a computing resource in the group of computing resources;
    using the benchmark raw number to determine a number of performance units on the device;
    determining a weighting factor, using the processor at the computer system, wherein the weighting factor of each computing resource is determined based at least on a resource type;
    calculating a cost of performance units configured by dividing a cost of a configuration by the number of performance units for the configuration;
    generating, using an efficiency analysis engine, performance indicators for a plurality of computing resources in the group of computing resources, the performance indicators at least based on the normalized benchmark the weighting factor for each computing resource, and the cost of performance;
    comparing the performance indicators; and
    reconfiguring, using realignment components at the computer system, a usage of at least some of the computing resources in the group of computer resources to improve processing performance of the group of computer resources, wherein the reconfiguration is based on a result of the comparison of the performance indicators.

2. The method of claim 1, further comprising calculating a cost of performance units utilized by dividing a usage cost for the configuration by the number of performance units for the configuration, wherein the usage cost comprises an operating cost for the configuration over a period of time.

3. The method of claim 2, further comprising displaying, on a graphical user interface, the performance indicators and the cost of performance units utilized for each of a plurality of selected computing resources.

4. The method of claim 3, further comprising plotting each computing resource as a data point on the graphical user interface.

5. The method of claim 2, further comprising multiplying the number of performance units for at least one of the computing resources from the group of computing resources by a first weighting factor based on usage of the computer resources.

6. The method of claim 5, wherein when the computing resource is a shared server, the first weighting factor is a fraction having a denominator equal to a number of shared users.

7. The method of claim 5, wherein the first weighting factor is selected based on a percentage of central processing unit (CPU) time used for a selected application.

8. The method of claim 1, further comprising collecting performance data from each computing resource.

9. The method of claim 8, further comprising storing the collected performance data in a global data warehouse.

10. The method of claim 1, further comprising providing at least one report ranking the computing resources across multiple dimensions.

11. The method of claim 1, further comprising implementing at least one realignment component to assess at least one realignment opportunity based on at least one pre-established optimal system performance guideline.

12. A computer-implemented system for improving processing performance analysis for a group of computing resources, the system comprising:
    at least one computer having a processor;
    a data storage;
    at least one performance indicator calculation engine implementing the processor for calculating a processing performance indicator for each computing resource in the group of computing resources, the processing performance indicator based at least on:
        a retrieved performance information data from the data storage;
        a calculated benchmark raw number which has been normalized;
        a weighting factor for each computing resource based at least on a resource type; and
        a cost of performance units configured, calculated by dividing a cost of a configuration by the number of performance units for a configuration; and
    at least one graphical user interface presentation tool for implementing each calculated processing performance indicator to provide a visual comparison for comparing processing performance for multiple computing resources in the group of computing resources; and
    at least one realignment component for facilitating a reconfiguration of at least some of the computing resources in the group of computer resources to improve processing performance of the group of computer resources based at least on a result of a comparison of the processing performance indicators.

13. The system of claim 12, further comprising a benchmarking engine for determining a benchmark for each computing resource in the group of computing resources.

14. The system of claim 13, further comprising at least one normalization component for normalizing the determined benchmark for each computing resource.

15. The system of claim 12, further comprising at least one data collection and warehousing component for collecting performance data from the computing resources and storing the performance data in a global data warehouse.

16. The system of claim 12, further comprising an efficiency analysis engine for comparing the calculated processing performance indicator with at least one pre-established optimal system parameter.

17. The system of claim 16, wherein the at least one realignment component is further configured for recommending a realignment of resources based on the comparison between the calculated processing performance indicator and the at least one pre-established optimal system parameter.

18. The system of claim 12, wherein the processing performance indicator comprises a cost of performance units utilized, calculated by dividing a usage cost for a configuration by the number of performance units for the configuration, wherein the usage cost comprises an operating cost for the configuration over a period of time.

19. A computer-implemented method for improving processing performance for a group of computing resources, the method implemented on at least one computer having a processor and accessing at least one data storage area, the method comprising:

implementing the processor for:

accessing at least one data storage, the data storage containing performance information data associated with a computing resource of the group of computing resources;

retrieving the performance information data from the data storage;

calculating a benchmark raw number for a computing resource in the group of computing resources;

normalizing the calculated benchmark raw number across the group of computing resources to determine a normalized number of performance units benchmark; and determining a usage cost for each computing resource based on data collected from the data storage area, wherein the usage cost comprises an operating cost for the configuration over a period of time;

creating a processing performance indicator for each computing resource based at least on the usage cost, the normalized number of performance units benchmark, a weighting factor calculated based at least on a resource type of each computing resource, and a cost of performance units configured calculated by dividing a configuration cost by the number of the performance units for a configuration;

comparing the performance indicators; and reconfiguring a usage of computing resources to improve processing performance of the group of computing resources based on a result of the comparison of the performance indicators.

* * * * *